Patented Jan. 19, 1954

2,666,693

UNITED STATES PATENT OFFICE 2,666,693

ACID TREATMENT OF PLASTIC ARTICLES

Zoltan Meretey, Stamford, Conn., assignor to PM Industries Incorporated, Stamford, Conn.

No Drawing. Application January 24, 1952,
Serial No. 268,119

8 Claims. (Cl. 41—42)

This invention relates generally to the art of making articles of plastic compositions and more particularly to the method of making plastic composition articles having surfaces possessing predetermined characteristics.

An object of this invention is to provide a novel process by which articles may be made by thermo plastic and thermo setting materials, which articles will have predetermined surface characteristics.

Attempts have been made in the past to make plastic articles with soft resilient surfaces. One of such attempts propose to attach a layer of felt-like material to the surface of the plastic article by use of a suitable adhesive. So far, these prior efforts are not satisfactory commercially.

The present invention aims to provide an inexpensive method that can be performed on a large scale commercially and by which can be made plastic articles having surfaces having a large variety of characteristics. For example, this process makes it possible to make plastic articles having soft fiber surfaces, abrasive surfaces, non-reflecting surfaces, and liquid absorbent surfaces. Articles molded from a thermo-setting or thermo-plastic material are readily treated by the herein disclosed process to give an article having the desired surface. Such articles may be used for many purposes, among others, cones for holding thread during thread spinning, and subsequent treatment of the thread in the textile industry. Also cones with this type surface may be used as mutes by a musician. Turn-tables for record players may also be produced by this process, handles and other articles wherein it is desired to have all or a portion of the surface thereof covered with a felt-like heat insulating and smooth soft gripping material.

Articles made from a thermo-setting or thermo-plastic composition containing a filler of the abrading type such as mica, emery, tungsten-carbide or similar materials may be treated by this process to expose the abrasive particles on the surface thereof.

The molding compositions from which such articles are made are plastic materials such as "BM 926"; "Durez 14900; 13,124; 1905 and 13,527" and certain types of rubber filled phenolic materials, such as "GE 12808" which is a phenolic plastic containing synthetic rubber of the "Hycar" type (U. S. Patent No. 1,973,000), and contains a fiber filler, such as scraps of textile material and fibers of the cotton flock type or other types of fiber embedded therein in the course of forming or molding the plastic article.

Particularly, this invention contemplates the formation of a plastic article containing a fibrous filler, such a plastic being susceptible of being attacked by an acid, and the fiber not being subject to an attack by the same acid, for example, a cotton or wood fiber.

In the preferred method the articles are molded and are then treated with an acid such as nitric, hydrochloric or sulphuric. For purposes of description the following example will be sufficient to illustrate the invention. "Durez 13124," which is a phenolic resin already mixed with a cotton flock, may be treated with sulphuric acid. With a straight phenolic resin, hydrochloric acid may be used. Particularly, the time of exposure and the temperature of the acid and the strength of the acid may be varied to give more or less etching of the surface, which will expose more or less of the fiber content to give an article a harder or softer surface texture.

The basic step of this process consists in contacting the surface to be treated with a strong acid to etch the surface and expose the fibers, removal of the acid and loose material by rinsing, and treatment with a mild alkali to neutralize the acid and removing such loose material as adheres to the surface; removal and neutralization of the alkali by the weak acid, drying, and the article is ready for use.

The molded articles, such as those made from "GE 12808" a butadiene-acrylonitrile rubber modified phenolic resin having a cotton flock filler, are placed on a conveyor of the continuous belt or chain drive type and passed through a series of tanks.

The first tank contains 36° Bé. nitric acid at a temperature of 140° F. and the article is contacted herein for approximately 16 minutes.

It is then passed into a second tank containing water at 170° F. and rinsed for approximately 8 minutes.

It is then passed into a third tank containing one percent sodium hydroxide for 8 minutes.

It is then passed into a fourth tank and rinsed in water at 170° F. for 8 minutes.

It is then passed into a fifth tank containing 5% nitric acid for approximately 8 minutes.

It is then rinsed for 8 minutes in a water bath and dried at 190° F. with hot air.

The acids used to etch preferably are nitric, sulphuric, or hydrochloric, depending upon the type of plastic. These baths are usually agitated and are continuously filtered in order to remove therefrom the solid particles of the plastic that are etched away but remain suspended in the bath.

The water baths are used to remove the treating agent and prevent excessive use of subsequent agents. The strong alkali, sodium hydroxide, is used in the above example, but potassium hydroxide or sodium carbonate may be used. The object of the alkali is to remove the acid and also to remove the remaining etched material. The second acid step in the above process is necessary in order to neutralize the alkali used.

The length of time that the articles are treated to give the felt-like surface controls the amount of the flock or fiber left on the surface of the article. In the above process, about three-fourths of the flock is exposed. This is 0.020 to 0.060 inch in length. Longer treatment in the original acid bath would expose more of the fiber and shorter treatment would expose less, depending on the depth of the felt desired on the surface of the article. As has been pointed out above, any one of the three factors affecting the acid treatment may be varied, that is, the temperature of the acid, the strength of the acid, or the time of immersion.

The detailed example of this treatment is explained hereinabove, but it should be realized, that details of the treatment process that fall within the scope of this invention may be varied.

What is claimed is:

1. A method of etching the surface of a rigid synthetic resin article containing a filler, to expose the filler, which comprises the steps of treating said article with an acid selected from the group consisting of nitric acid, sulphuric acid and hydrochloric acid, removing the acid and drying the article.

2. A method of felting the surface of an article cast from a hardenable plastic substance containing a fiber filler which comprises contacting the article with an acid, removing the acid and drying.

3. A method of producing a felt-like surface on an article cast from a phenolic butadiene acrylonitrile, containing a fiber filler which comprises contacting the article with nitric acid, removing the excess acid and drying the article.

4. A method of producing a felt-like surface on an article cast from a phenolic butadiene acrylonitrile, containing a cotton flock, which comprises contacting the article with nitric acid, removing the excess acid and drying the article.

5. A method of producing a felt-like surface on an article cast from a phenolic resin containing a fiber filler, which comprises contacting the article with hydrochloric acid, removing the excess acid and drying the article.

6. A method of producing a felt-like surface on an article cast from a phenolic resin containing a cotton flock filler, which comprises contacting the article with sulphuric acid, removing the excess acid, and drying the article.

7. A method of producing an abrasive surface on an article cast from a hardenable plastic substance containing an abrasive filler which comprises contacting the article with an acid, removing the acid and drying.

8. A method of producing an abrasive surface on an article cast from a phenolic butadiene acrylonitrile containing an abrasive substance which comprises contacting the article with nitric acid, removing the excess acid and drying the article.

ZOLTAN MERETEY.

References Cited in the file of this patent

UNITED STATES PATENTS

| Number | Name | Date |
|---|---|---|
| 2,366,788 | Horback | Jan. 9, 1945 |